G. W. TODD & C. D. MENDLIK.
DENTAL BRIDGE.
APPLICATION FILED JULY 27, 1914.
1,136,184. Patented Apr. 20, 1915.
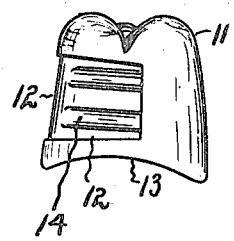
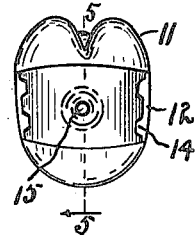
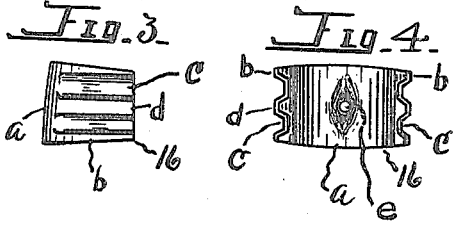
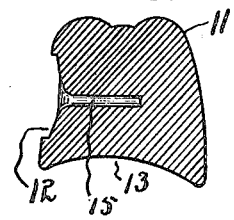
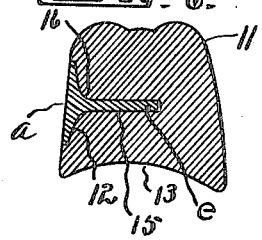
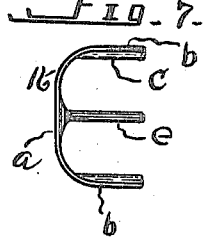
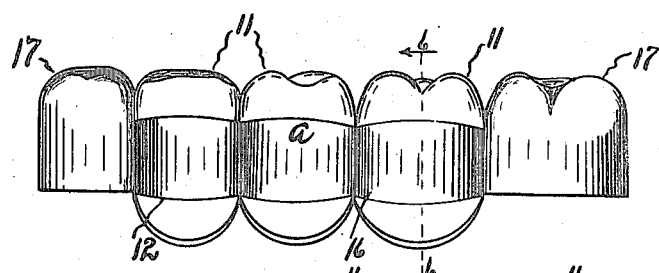
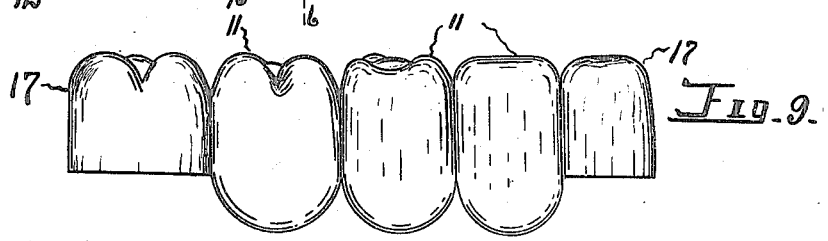
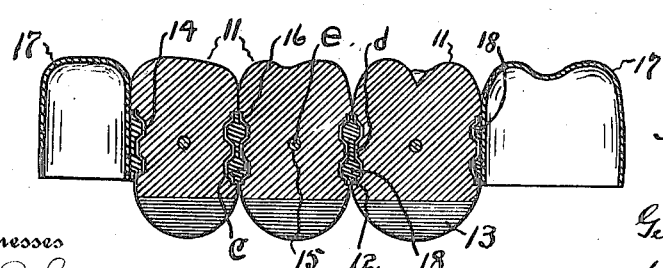
Witnesses
A. P. Leyson
C. E. Clark
Inventors
George W. Todd and
Charles D. Mendlik,
By Hiram A. Sturges,
Attorney

UNITED STATES PATENT OFFICE.

GEORGE W. TODD AND CHARLES D. MENDLIK, OF OMAHA, NEBRASKA; SAID MENDLIK ASSIGNOR TO GEORGE W. TODD.

DENTAL BRIDGE.

1,136,184. Specification of Letters Patent. Patented Apr. 20, 1915.

Application filed July 27, 1914. Serial No. 853,433.

*To all whom it may concern:*

Be it known that we, GEORGE W. TODD and CHARLES D. MENDLIK, citizens of the United States, residing at Omaha, in the county of Douglas and State of Nebraska, have invented certain new and useful Improvements in Dental Bridges, of which the following is a specification.

This invention relates to an improvement in dental bridges, and has for its principal object to provide a substantially flat metallic strip for the bridge, so disposed that the stresses, sustained by the bridge, will be directed edgewise of said strip, to thereby require less metal and conducing to convenience in manufacture.

With the foregoing objects in view and others to be mentioned hereinafter, the invention presents a novel and useful construction, combination and arrangement of parts, as described herein and claimed, and as illustrated in the drawing, wherein,—

Figure 1 is a side view of a dental tooth. Fig. 2 is a view of the back of the tooth. Fig. 3 is a side view of one of the U-shaped bands or clasps. Fig. 4 is a view of the inner side of the clasp. Fig. 5 is a sectional view of the tooth on line 5 5 of Fig. 2. Fig. 6 is a view showing the tooth and clasp in section, on line 6 6 of Fig. 8. Fig. 7 is a plan view of the clasp. Fig. 8 is a view of a bridge in rear elevation. Fig. 9 is a view of the bridge in front elevation. Fig. 10 is a view of the bridge in longitudinal section.

Referring now to the drawing, numerals 11 indicate teeth constructed of porcelain or other suitable material, said teeth preferably having their bases formed concaved or saddle-shaped as indicated at 13, so that when used in a bridge they will conform to the surface of the gums. Each tooth is provided between its ends to open on its back and two opposed sides with a recess 12; and at 14 are indicated recesses or grooves formed in opposed sides of each tooth, said grooves 14 opening on recess 12, each of recesses 14 having a front end which terminates at the front end of a recess 12, between the front and back of the tooth.

Numeral 15 indicates a pocket or aperture opening on the back of each tooth in a recess 12.

At 16 is indicated a metallic holder or clasp, consisting of a flat strip or band which may be bent or cast to form, midway between its ends, a curved body-portion or back $a$ and parallel wings, side pieces or arms $b$, each provided with parallel, longitudinal grooves $c$ and ridges $d$. The clasps thus formed are substantially of U-shape, and the curved back $a$ is provided with the projection or pin $e$ disposed between and parallel with the wings $b$. Each clasp may be disposed with its back $a$ and grooves $c$ engaging in recesses 12 and 14 of a tooth, the pin $e$ being disposed in aperture 15 of the tooth.

Figs. 8, 9 and 10 illustrate a bridge consisting of the crowns 17 and the parts described. As shown in Fig. 10, solder 18 may be employed between the ridges and grooves of the clasps for sustaining them in connected relation, the solder being also used between the clasps and crowns, the several clasps thus connected forming a metallic strip extending between the crowns of the bridge.

The teeth as described are manufactured in assorted sizes, and in operation to form a bridge, after the clasps have been connected side by side by use of the solder, the crowns having been connected to the clasps as mentioned, the teeth without exposure to heat are mounted between the wings of the clasps, cement preferably being used for maintaining the teeth in connected relation with the clasps, said clasps substantially filling the recesses and apertures of the teeth.

Since the recesses 12 and 14 terminate at the sides, intermediate the front and back of the teeth, no metallic part between the teeth will be visible from the front of the bridge, this being desirable for the reason that, after a lapse of time, certain kinds of metal which may be employed, may become discolored.

Since the stresses of a bridge are generally directed in alinement with the longitudinal axes of the teeth, it will be noted that, as described herein, these stresses will be directed edgewise of the metallic strip, and therefore a less quantity of metal will be required than in instances where the metal is disposed above or under the porcelain parts.

By reason of the novel features herein described, entire porcelain teeth may be employed instead of teeth having a two-part construction, by which a considerable amount of labor may be saved in making the bridge, since the work is simplified, and since the clasps engage only the sides and back, any of the teeth may be conveniently replaced, if desired.

What we claim and desire to secure by Letters Patent is,—

1. A dental bridge, comprising, in combination with a plurality of connected clasp members disposed side by side, each consisting of a curved band with a pair of substantially parallel wings, a plurality of teeth each being provided with a recess in its back and a recess in each of two opposed sides adapted to be mounted on a clasp member, the recess in its back being engaged by the curved part of the band, the recesses in its opposed sides being engaged by the wings of said band.

2. A dental bridge, comprising, in combination with a plurality of connected clasp members disposed side by side, each consisting of a curved band and a pair of substantially parallel wings having ridges formed thereon, a plurality of teeth each being provided with a recess in its back, a recess in each of two opposed sides and with grooves opening on the recesses in its sides, each tooth being adapted to be mounted on a clasp member, the recesses in its back and sides being engaged respectively by the curved part of the band, the grooves opening on the recesses of its sides being engaged by the ridges of said wings.

3. A dental bridge, comprising, in combination with a plurality of connected clasp members disposed side by side, each consisting of a band curved between its ends to provide a pair of substantially parallel wings and provided with a pin disposed intermediate said wings, a plurality of teeth each being provided with a recess in its back, a recess in each of two opposed sides and an aperture opening on the recess of its back, said teeth being adapted to be mounted on the clasp members, the curved part, the parallel wings and the pin of each band engaging, respectively, in the recess of the back, the recesses in the sides and the aperture of a tooth.

In testimony whereof, we have affixed our signatures in presence of two witnesses.

GEORGE W. TODD.
CHARLES D. MENDLIK.

Witnesses:
 HEIRAM A. STURGIS,
 GEO. D. MARSH.